United States Patent
Nam et al.

(10) Patent No.: US 10,102,211 B2
(45) Date of Patent: *Oct. 16, 2018

(54) SYSTEMS AND METHODS FOR MULTI-THREADED SHADOW MIGRATION

(71) Applicant: Oracle International Corporation, Redwood City, CA (US)

(72) Inventors: Young Jin Nam, Cupertino, CA (US); Timothy Patrick Haley, Boulder, CO (US); Swanand Shreekant Rao, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 517 days.

This patent is subject to a terminal disclaimer.

(21) Appl. No.: 14/688,844

(22) Filed: Apr. 16, 2015

(65) Prior Publication Data
US 2015/0302016 A1 Oct. 22, 2015

Related U.S. Application Data

(60) Provisional application No. 61/981,652, filed on Apr. 18, 2014, provisional application No. 62/043,168, filed on Aug. 28, 2014.

(51) Int. Cl.
*G06F 7/00* (2006.01)
*G06F 17/30* (2006.01)

(52) U.S. Cl.
CPC .. *G06F 17/30079* (2013.01); *G06F 17/30176* (2013.01); *G06F 17/30203* (2013.01); *G06F 17/30221* (2013.01)

(58) Field of Classification Search
CPC ......... G06F 17/30079; G06F 17/30176; G06F 17/30203; G06F 17/30221
USPC ....................................................... 707/609
See application file for complete search history.

(56) References Cited

U.S. PATENT DOCUMENTS

| 6,108,653 A | * | 8/2000 | Pereira | G06F 17/30289 |
| 6,442,601 B1 | * | 8/2002 | Gampper | H04L 29/06 |
| | | | | 709/218 |
| 7,574,461 B1 | * | 8/2009 | Armorer | G06F 11/1458 |

(Continued)

OTHER PUBLICATIONS

Oracle, "Oracle ZFS Storage Appliance" retrieved from https://www.oracle.com/storage/nas/index.html, retrieved on Nov. 10, 2017, all pages.

(Continued)

*Primary Examiner* — Tony Mahmoudi
*Assistant Examiner* — Michael Le
(74) *Attorney, Agent, or Firm* — Kilpatrick Townsend & Stockton LLP

(57) ABSTRACT

Implementations described and claimed herein provide systems and methods for migration data from a source to a target in the background using an optimal number of threads. In one implementation, a directory entry in a source file system is compared to a size threshold. An optimal number of threads for a migration associated with the directory entry is allocated. The optimal number of threads is determined based on a degree of parallelism available for the migration and the comparison of the directory entry to the size threshold. The directory entry is migrated from the source file system to a target file system using the optimal number of threads.

28 Claims, 8 Drawing Sheets

(56) References Cited

U.S. PATENT DOCUMENTS

| | | | | |
|---|---|---|---|---|
| 8,166,323 | B2* | 4/2012 | Cai | G06F 1/3203 |
| | | | | 713/322 |
| 8,260,798 | B2 | 9/2012 | Schrock et al. | |
| 2011/0153953 | A1* | 6/2011 | Khemani | G06F 12/0895 |
| | | | | 711/136 |
| 2011/0213813 | A1* | 9/2011 | Leventhal | G06F 17/30079 |
| | | | | 707/825 |
| 2011/0313976 | A1* | 12/2011 | Leventhal | G06F 17/30079 |
| | | | | 707/687 |
| 2012/0124081 | A1* | 5/2012 | Ebrahimi | G06F 17/303 |
| | | | | 707/769 |
| 2012/0131309 | A1* | 5/2012 | Johnson | G06F 9/30 |
| | | | | 712/41 |
| 2014/0324928 | A1* | 10/2014 | Tinker | G06F 17/30203 |
| | | | | 707/827 |
| 2015/0302026 | A1 | 10/2015 | Nam et al. | |

OTHER PUBLICATIONS

U.S. Appl. No. 14/688,804 received a Non-Final Office Action, dated Oct. 5, 2017, 25 pages.
U.S. Appl. No. 14/688,804, Final Office Action dated Mar. 22, 2018, 16 pages.
U.S. Appl. No. 14/688,804, Notice of Allowance dated Jun. 22, 2018, 11 pages.

* cited by examiner

SYSTEMS AND METHODS FOR MULTI-THREADED SHADOW MIGRATION

CROSS-REFERENCE TO RELATED APPLICATION

The present application claims benefit under 35 U.S.C. § 119 to U.S. Provisional Patent Application No. 61/981,652, entitled "Method and System for Multi-Threaded Shadow Migration" and filed on Apr. 18, 2014, and to U.S. Provisional Patent Application No. 62/043,168, entitled "Method and System for Multi-Threaded Shadow Migration" and filed Aug. 28, 2014. Each of these applications is incorporated by reference herein in its entirety.

TECHNICAL FIELD

Aspects of the present disclosure relate to network file systems utilizing storage appliances and more particularly to systems and methods for migrating existing data on a source to a target using multiple threads.

BACKGROUND

The continuous expansion of the Internet, the expansion and sophistication of enterprise computing networks and systems, the proliferation of content stored and accessible over the Internet, and numerous other factors continue to drive the need for large sophisticated data storage systems. Consequently, as the demand for data storage continues to increase, larger and more sophisticated storage systems are being designed and deployed. Many large scale data storage systems utilize storage appliances that include arrays of storage media. These storage appliances are capable of storing incredible amounts of data. For example, some storage appliances can store over 2 petabytes of data (over 2 quadrillion bytes of data). Moreover, multiple storage appliances may be networked together to form a cluster, which allows for an increase in the volume of stored data.

Storage appliances typically include a file system configured to store and retrieve files and a hierarchical directory structure for the naming of multiple files. In some instances, data on an existing source file system needs to be migrated to a new target file system. Such a migration is typically achieved by initially taking the source file system offline, thereby preventing users from reading or writing to the source file system, and transferring each directory and file to the target file system. Conventionally, a single thread is utilized to perform migration of a directory or a file, which may take a significant period of time for larger sized directories or files. While employing multiple threads may increase migration speed, the performance gain using multiple threads may be saturated due to the serialization of some migration operations for data integrity. Thus, simply adding additional threads does not equate to increased performance during migration. It is with these observations in mind, among others, that various aspects of the present disclosure were conceived and developed.

SUMMARY

Implementations described and claimed herein address the foregoing problems by providing systems and methods for allocating an optimal number of threads for background migration. In one implementation, a directory entry in a source file system is compared to a size threshold. An optimal number of threads for a migration associated with the directory entry is allocated. The optimal number of threads is determined based on a degree of parallelism available for the migration and the comparison of the directory entry to the size threshold. The directory entry is migrated from the source file system to a target file system using the optimal number of threads.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
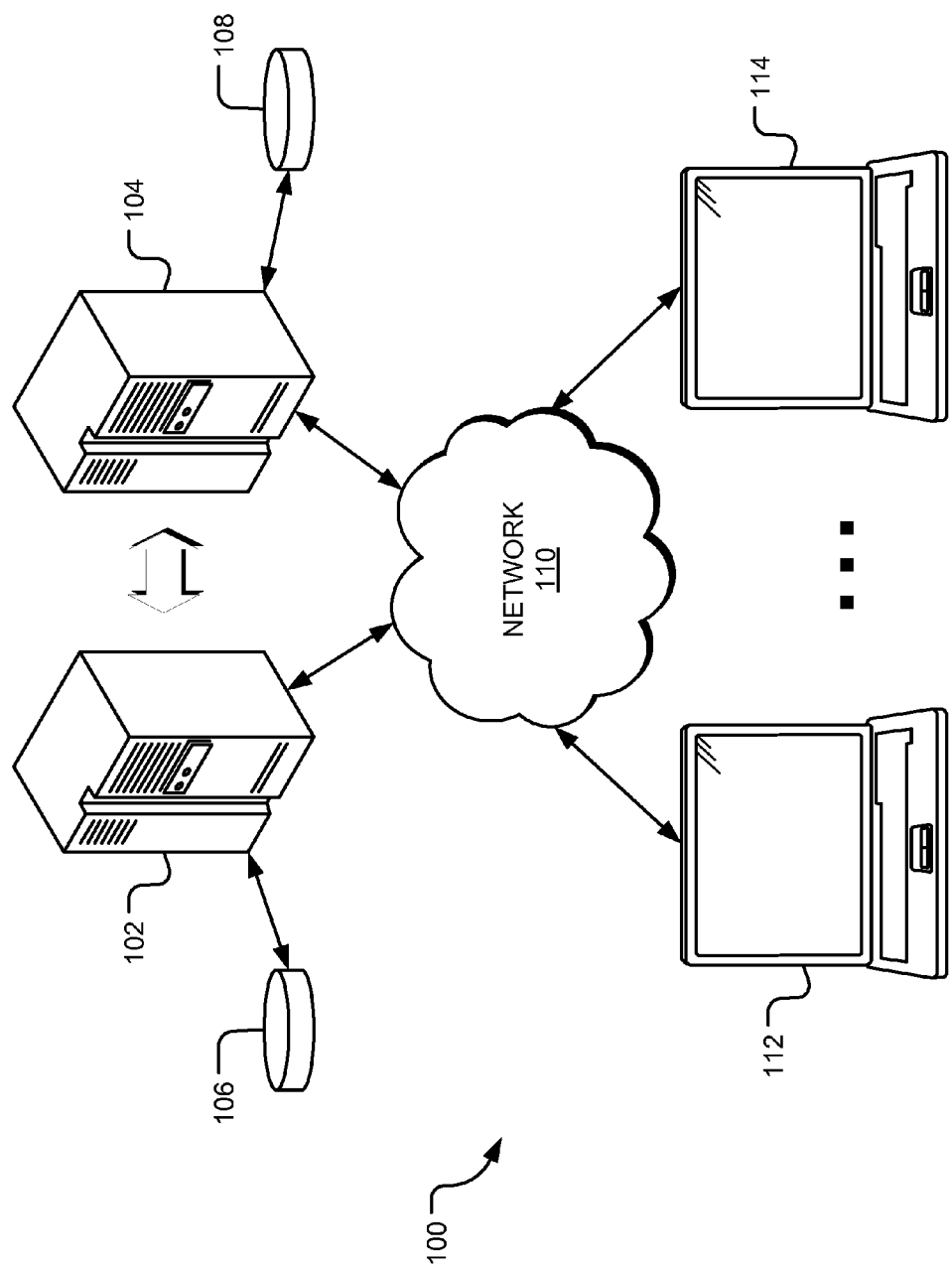
FIG. 1 illustrates an example storage system for background migration using an optimal number of threads.

A common task for administrators is to move data from one storage location to another, such as when updating or adding computing and storage equipment. Aspects of the present disclosure generally involve systems and methods for migrating existing data on a source to a target. Shadow migration involves moving data based on a hierarchy directory structure while permitting clients to actively access directories and files during migration. The source appears as a file system with a plurality of directory entries representing directories, subdirectories, and files. Each directory entry includes the name of the corresponding entity (e.g., directory, subdirectory, or file) and is associated with corresponding metadata and data, if applicable. The data is migrated from the source to the target by traversing each of the directory entries.

One or more threads are devoted to migrating the data from the source to the target in the background, in addition to servicing inline requests. Generally, allocating additional threads increases parallelism and the overall speed of migration at the expense of resources. For example, employing multiple threads to migrate a large file or a directory with a large number of entries may increase migration speed relative to single threaded migration. Because some migration operations need to be serialized for data integrity, however, the performance gain using multiple threads can be saturated depending on the number of threads allocated to the migration. Moreover, threads may be allocated from a shared thread pool used for other directory and file migrations, emphasizing the need to allocate a proper number of threads for each migration. In short, simply adding additional threads does not equate to increased performance during migration. Thus, aspects of the present disclosure involve allocating an optimal number of threads for shadow migration.

In one aspect, prior to migration of a directory or file, one or more threads are allocated from a pool of threads. Multiple threads, rather than a single thread, are allocated for the migration where a threshold is exceeded. For example, multiple threads for migrating a directory are employed where a directory has a number of entries exceeding a predefined number. Similarly, multiple threads for migrating a file are employed where a file has a size exceeding a predefined size. An optimal number of threads is determined based on a degree of parallelism available for the migration. Each file or directory migration involves the time that should be serialized for correctness and the remaining time that can be parallelized with multiple threads. Using these values, an expected performance gain is calculated, and using the derivative of the expected performance gain, the minimum number of threads is computed, which represents the optimal number of threads.

To continue with migration of a directory, metadata for content in the directory is obtained from the source file system using the optimal number of threads. A directory entry is created in the directory on the target file system for each file and subdirectory using the metadata. The directory entry is associated with a file level attribute specifying that the file or subdirectory is unmigrated. The attribute for each directory entry is unmarked when migration is complete. Continuing with migration of a file, a file system operation request is processed, and the file is migrated using the optimal number of threads.

To begin a detailed description of an example storage system 100 configured to migrate data with an optimal number of threads, reference is made to FIG. 1. As can be understood from FIG. 1, the example storage system 100 includes a source 102 from which data is migrated to a target 104. Generally, the source 102 and the target 104 each manage the storage of data on storage media 106-108, which may involve spinning media (e.g., disc drives) as well as various forms of persistent memory, such as solid state memory. The source 102 may be, without limitation, a network-attached storage (NAS) device, such as a storage appliance, including a file-level storage server providing data access over a network 110 to one or more user devices 112-114 on a client network. The target 104 may be, for example, a storage appliance, such as a ZFS storage appliance, which is a combined file system and volume manager designed by Sun Microsystems® in 2005 that allows for data integrity verification and repair, high storage capacities, along with numerous other features and advantages. Although discussed herein in the context of a NAS device and a ZFS storage appliance, the source 102 and the target 104 may each be any storage device.

In one implementation, the storage system 100 includes a client network having one or more user devices 112-114. Storage devices may be accessible by the client network using the network 110. It will be appreciated, however, that the various networks may comprise an integrated network, and the connections between the networks represent but one possible network topology. The various networks may also be local in nature or geographically dispersed, such as with large private enterprise networks or the Internet. The user devices 112-114 are generally any form of computing device capable of interacting with the network 110, such as a terminal, a workstation, a personal computer, a portable computer, a cellphone, a mobile device, a tablet, a multimedia console, and the like. In some implementations, the client network includes one or more user interfaces, including, for example, a browser user interface, permitting a user to interact with a storage device to access data and/or manage the storage device.

ZFS based systems utilize a storage pool layer having one or more storage pools (often referred to as "zpools") comprising virtual devices (vdevs) constructed of block devices, such as the storage media 106-108. A block device is any device that moves data in the form of blocks, which may be, without limitation, hard disk drives, solid state drives, optical drives, magnetic drives, and other addressable regions of memory. A ZFS volume is a dataset that represents a single block device. A virtual device may span a number of block devices or volumes, and a storage pool may include one or more virtual devices, each including one or more partitions of storage media or one or more storage media.

Traffic to and from the source 102 or the target 104 is typically managed by one or more dedicated storage servers located within the source 102 or the target 104 or a storage network. A common protocol employed by storage appliances for accessing content, including files, directories, and their associated metadata is a Network File System (NFS). NFS is a widely used distributed file system protocol, originally developed by Sun Microsystems® in 1984 and currently in version 4 (NFSv4). NFS allows the client network to access stored data seamlessly by providing a programming interface permitting the user devices 112-114 to: create and delete files; read and write files; perform seeks within a file; create and delete directories; manage directory contents; and perform other file, directory, or content operations. The operating system utilized by the user devices 112-114 is configured to communicate with the NFS programming interface to manage the file system and the interaction between executing applications with data residing in the source 102 or target 104. Generally, NFS systems manage file system metadata and provide access to files and directories. The metadata describes the location of the files and directories on the storage media 106, 108. A storage appliance maintains a log of current operations being performed by the client network. Another common protocol that may be employed by storage appliances for accessing content and facilitating communications between nodes on a network is Server Message Block (SMB).

It is common for an administrator of the storage system 100 to move existing data from one storage location to another. Shadow migration is a process for migrating data from the source 102, which may include one or more external NAS sources or SMB sources, to the target 104, which may be a ZFS storage appliance. This is often used, for example, when the target 104 is introduced into an existing environment to take over file sharing duties of the source 102, in some cases, with the intent of replacing or decommissioning the source 102 once the migration is complete.

Shadow migration may be integrated into the target 104 without requiring a separate physical machine. In one implementation, the target 104 creates shares that are configured to shadow an existing directory on the source 102, either locally or over NFS or SMB. In this implementation, access to the data by the user devices 112-114 is limited only one time, where the source 102 is placed into read-only mode, a share is created with the shadow property set, and the user devices 112-114 are updated to point to the new share on the target 104. The user devices 112-114 can then access the target 104 in read-write mode.

Once the shadow property is set, data is transparently migrated in the background from the source 102 locally. If one of the user devices 112-114 issues a request for a file that has not yet been migrated, the target 104 will automatically migrate the requested file to the local server before responding to the request. Thus, since access time figures into priority, the most recently used data is generally migrated first. The shadow migration may involve the systems and methods described, for example, in U.S. patent application Ser. No. 12/820,723, now U.S. Pat. No. 8,260,798, entitled "Method and System for Partial Shadow Migration" and filed on Jun. 22, 2010, which is specifically incorporated by reference in its entirety herein.

In one implementation, the source 102 and the target 104 are each configured to store and organize files, including corresponding file metadata and file data, and to associate metadata with directories. The metadata associated with directories and files may include regular attributes and extended attributes. Examples of metadata stored with regular attributes include, without limitation, access permissions for a file or directory and date and time a file was created and/or modified. Extended attributes may be used to associate metadata with files and/or directories. In one implementation, a root of the target 104, directories in the target 104, and files in the target 104 each include at least one extended attribute used to indicate whether the root, directory, or file has been migrated.

In one implementation, one or more file systems are associated with on-disk space map(s) located in persistent storage media (e.g., the storage media 108). A space map is a data structure used to track which portions of a file have been transferred from the source 102 to the target 104. The space map may be implemented on a per-file basis as a log of transactions on the file. Each time a portion of a file is copied to the target 104 from the source 102, the corresponding space map records which portion of the file was copied. In one implementation, the space map starts with a total range of the file on the source 102 that has not been transferred to the target 104, denoted as a remote range. As portions of the file are copied to the target 104 from the source 102 or new data is written to the file on the target 104, the space map includes these entries reflecting a local range. Over time, the space map may be compressed to occupy less space. In this case, the remote range may be combined with the local ranges to obtain one or more remote ranges. The underlying data structure(s) used to implement the space maps may include, without limitation, log files, an Adelson-Velsky and Landis (AVL) tree, B-trees, Bitmaps, or any other structure capable of tracking which portions of the file have been copied from the source 102 to the target 104 and/or indicate which portions of the file are present on the target 104 due to write operations.

The in-memory space map and the on-disk space map of a given file may be in different states. In one implementation, the in-memory space map for a given file is represented as one or more remote ranges (i.e., portions of the file solely existing on the source 102). Further, as additional portions of the file a migrated to the target 104, additional remote ranges are added or updated after the portion of the file is copied to the target 104. Conversely, the on-disk space map includes the remote range(s) as well as any local ranges, which correspond to portions of the file which were transferred to the target 104 since the time the remote range initialized or last updated.

In one implementation, a file system operation request is received at the target 104 from one of the user devices 112-114. The file system operation request may be, without limitation, read, write, open, close, mkdir, rmdir, rename, sync, unmount, mount, and the like. Where the file system operation request is not a read request (e.g., a write request), the target 104 processes file system operation request. In one implementation, if the file system operation request includes a partial write of file data (i.e., a portion of the file data is to be overwritten), the corresponding directory entry, including the metadata and file data, is migrated from the source 102 to the target 104 prior to processing the file system operation request from the target 104. Where the file system operation request is a read request, the target 104 determines whether the migration of the data from the source 102 is complete. Migration of the source 102 is complete when all data and metadata from the source 102 has been copied or otherwise transmitted to the target 104.

The manner in which the data associated with the read request is migrated from the source 102 to the target 104 depends on whether the request is for a directory or a file. Where the read request is for a directory, the directory entry corresponding to the requested directory is located in the target 104. In one implementation the directory entry includes at least metadata associated with the directory and a migration attribute, which may be marked or unmarked depending on whether the directory has been migrated. A marked migration attribute indicates that the directory is a shadow directory. A shadow directory corresponds to a shadow of the directory, typically as part of an overall shadow of the file system of the source 102, including shadows of directories, subdirectories, and files, on the target 104. In this case, the actual directory has not been migrated to the target 104. Instead, the target 104 includes a shadow directory involving metadata with information concerning the actual directory on the source 102.

If the migration attribute is unmarked, the directory has been migrated from the source 102 to the target 104, and the read request is processed from the target 104. If the migration attribute is marked, the directory has not been migrated from the source 102 to the target 104. A directory is migrated where a corresponding directory entry for each file and subdirectory on the source 102, as well as the associated metadata, is in the directory on the target 104. The directory entries for the files in the directory on the target 104 do not need to include corresponding file data for the directory to be deemed migrated.

Prior to migration of the directory, an optimal number of threads is allocated from a pool of threads to migrate the directory from the source 102 to the target 104. In one implementation, the threads are running on different cores. Employing multiple threads to migrate a directory, particular a large directory with many entries, may make the migration faster. However, not all migration operations can or should be parallelized or otherwise processed with multiple threads. For example, some migration operations should be serialized for data integrity. With some operations being serialized, there is a number of threads that when exceeded saturates performance gains. Stated differently, because threads are a shared resource, in one implementation, shadow migration involves determining when to use multiple threads and how many threads to use. Multiple threads may not be needed for migration of a directory where a threshold is not exceeded. Furthermore, using more threads does not help if the performance has already been saturated due to serialization.

Whether to use multiple threads is determined based on a threshold. In one implementation, multiple threads are employed, rather than a single thread, for a directory migration where the directory has a number of entries that exceeds a predefined number, which may be set using the browser user interface. For example, the threshold may be 32 directory entries, so where a directory has at least 32 entries, multiple threads are employed for the directory migration.

Where the threshold is exceeded, in one implementation, an optimal number of threads for the directory migration is determined based on the degree of parallelism available. In one implementation, reading each of the directory entries from the source is serialized, so the use of additional threads will not increase performance. However, other portions of a directory migration are highly parallelized. For example, creating each directory entry and migration of metadata contents for the directory entry can be running in parallel. Assuming that each directory migration involves [s, p], where s represents the time that should be serialized for correctness and p represents the remaining time that can be parallelized with multiple threads, a single thread takes [s, p] time for a migration, whereas n threads takes $$\left[s, \frac{p}{n}\right]$$

time for a migration. The expected performance gain is:

$$G(n) = \frac{[1+d]}{\left[1+\frac{d}{n}\right]},$$

where $$d = \frac{p}{s}$$

and the derivative of the expected performance gain is:

$$G'(n) = d * \frac{(d+1)}{(n+d)^2}$$

From the derivative of the expected performance gain, the minimal number of threads ($n_{min}$) is:

$$(n_{min}) = \max\left\{n_i \,\middle|\, d * \frac{(d+1)}{(n_i+d)^2} > \Delta\right\},$$

where $\Delta$ represents a demanded minimum performance gain slope.

In one implementation, $\Delta$ is configurable. In another implementation, $\Delta$ is predefined. Where the performance gain is not greater than $\Delta$, the performance is saturated, such that additional threads do not increase performance. Stated differently, the maximum number of threads is represented by the point after which the performance gain is below $\Delta$. The optimal number of threads corresponds to the point at which the performance gain is maximized. In one implementation, the optimal number of threads ($n_{opt}$) is:

$$(n_{opt}) = \min\left[\text{ceil}\left(\frac{val}{\text{thresh}}\right), n_{min}\right],$$

where the ceil function returns the smallest integer value, val is a given value for the directory, and thresh is a predefined threshold (e.g., 32). In one implementation, with a high-speed network between the source 102 and the target 104, the optimal number of threads for directory migration is approximately 6-7 threads, which obtains a performance gain of approximately 5-6.

In one implementation, metadata for content in the directory (e.g., file metadata and/or subdirectory metadata) is obtained from the source 102 using the optimal number of threads. Here, the metadata involves any directory attributes, such as indexes, last access time, creation time, and the like, needed to migrate the directory to the target 104. The attributes are obtained from the source 102. A directory entry is created in the directory on the target 104 for each file and subdirectory using the metadata. In one implementation, while the directory is being migrated to the target 104, shadows for all directory entries (e.g. files, records, other directories, etc.) within the directory are generated. The shadow of an entry may involve a data path on the source 102 for the entry. In one implementation, a marked directory entry corresponds to a directory entry for a file with a marked migration attribute or directory entry for a subdirectory with a marked migration attribute. Further, the path to each subdirectory and/or file identified with the metadata is stored in an extended attribute for the corresponding directory entry.

Additionally, in one implementation, a space map is created for each file identified in the metadata when migration of the file is initiated. The in-memory and on-disk space maps for each file are initialized with a remote range of the file. The remote range at the time of initialization corresponds to the portions of the file located on the source 102 but not on the target 104. The migration attribute for the directory entry is unmarked when migration of the directory is complete, and the read request is processed using the target 104. The metadata may be obtained using multiple threads, as well as the creation of the directory entry on the target 104. In some implementations, for operations that should be serialized, the thread may be assigned with some threads idle while serial operations are occurring.

Where the read request is for a file, the directory entry for the file is located in the target 104. In one implementation, the directory entry for the file includes at least metadata associated with the file and a migration attribute, which may be marked or unmarked depending on whether the file has been migrated from the source 102 to the target 104. A file is considered migrated when the file data has been obtained from the source 102 by the target 104. If the migration attribute is unmarked, the file has been migrated from the source 102 to the target 104, and the read request is processed from the target 104. If the migration attribute is marked, the file has not been migrated and is a shadow file.

In one implementation, where the file is not migrated, an optimal number of threads is allocated to migrate the file from the source 102 to the target 104. As discussed herein, not all migration operations can or should be parallelized or processed with multiple threads. Migration of a file involves determining when to use multiple threads and how many threads to use. Multiple threads may not be needed for a file migration where a threshold is not exceeded. Furthermore, using more threads does not help if the performance has already been saturated due to serialization.

Whether to use multiple threads is determined based on a threshold. Multiple threads are employed, rather than a single thread, for a file migration where the file has a size that exceeds a predefined threshold, which may be set using the browser user interface. For example, the predefined threshold may be 256 MB, so multiple threads are employed for the file migration where a size of the file is at least 256 MB.

Where the file size exceeds the threshold, an optimal number of threads for the file migration is determined based on the degree of parallelism available. In one implementation, while reading data from the source 102 runs in parallel, writing migrated data to a file in the target 104 and updating a space map for the file is serialized where the use of additional threads will not increase performance. Assuming that each file migration involves [s, p], where s represents the time that should be serialized for correctness and p represents the remaining time that can be parallelized with multiple threads, a single thread takes [s, p] time for a migration, whereas n threads takes $$\left[s, \frac{p}{n}\right]$$

time. For bigger files, s is generally substantially larger than p. Using these values, the expected performance gain is:

$$G(n) = \frac{[1+d]}{\left[1+\frac{d}{n}\right]},$$

where $$d = \frac{p}{s}$$

and the derivative of the expected performance gain is:

$$G'(n) = d * \frac{(d+1)}{(n+d)^2}$$

From the derivative of the expected performance gain, the minimal number of threads ($n_{min}$) is:

$$(n_{min}) = \max\left\{n_i \mid d * \frac{(d+1)}{(n_i+d)^2} > \Delta\right\},$$

where $\Delta$ represents a demanded minimum performance gain slope.

In one implementation, $\Delta$ is configurable. In another implementation, $\Delta$ is predefined. Where the performance gain is not greater than $\Delta$, the performance is saturated, such that additional threads do not increase performance. Stated differently, the maximum number of threads is represented by the point after which the performance gain is below $\Delta$. The optimal number of threads corresponds to the point at which the performance gain is maximized. In one implementation, the optimal number of threads ($n_{opt}$) is:

$$(n_{opt}) = \min\left[\text{ceil}\left(\frac{val}{\text{thresh}}\right), n_{min}\right],$$

where the ceil function returns the smallest integer value, val is a given value for the file, and thresh is a predefined threshold (e.g., 256). In one implementation, with a high-speed network between the source 102 and the target 104, the optimal number of threads for file migration is approximately 2 threads, which obtains a performance gain of approximately 2.

In one implementation, the read request is processed where the file is migrated to the target 104 using the optimal number of threads. The migration of different files may be parallelized. For each file, once the file migration is initiated a space map is created. In one implementation, space map(s) are updated by: updating remote range and/or adding an additional remote range in the in-memory space map to reflect the transfer of data, if any, and; adding a local range to the on-disk space map to reflect the transfer of data, if any.

The migration attribute for the file may be unmarked where the entire file, as opposed to portions of the file, has been copied to the target 104. The read request for the file is then processed using the target 104. With respect to space maps, it is possible that after a shadow file has been created on the target for a file on the source, to access only a part of the data in the file, and a space map (or space attribute) for the file is updated to indicate that a portion of the file associated with the part of the file accessed has been migrated but the entire file is not migrated. For example, with respect to a 100 KB file and its shadow file, when one of the user devices 114-116 requests the first 10 KB of the 100 KB file, the first 10 KB is retrieved from the source 102, stored on the target 104, and the space map is updated to reflect the migration of the first 10 KB of file data. At this point, the file is still marked as a shadow. If the remaining 90 KB of the file is subsequently requested, the corresponding portion of the file is migrated and the file is unmarked to reflect that the file is fully migrated. Here, the shadow attribute and space attribute are unmarked.

Figure 2:
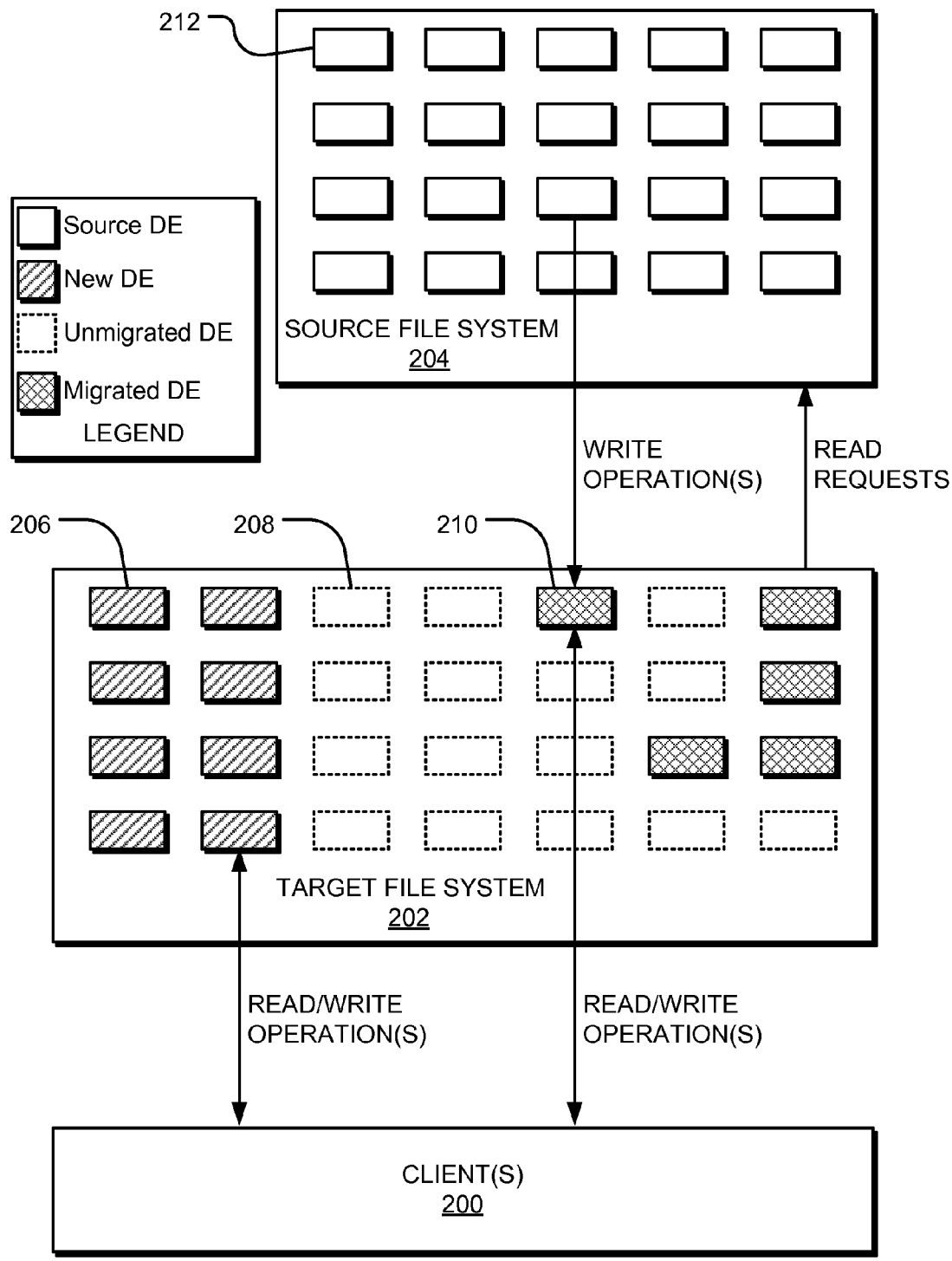
FIG. 2 depicts an example storage system depicting an interaction between client(s), a source file system, and a target file system during background migration using an optimal number of threads.

Turning to FIG. 2, an example storage system depicting an interaction between client(s) 200, a target file system 202, and a source file system 204 during shadow migration using an optimal number of threads. The client 200 may be any remote or local process, including an operating system process, which includes functionality to issue a file system operation request. The file system operation request may involve directory entries represented as blocks in FIG. 2.

In one implementation, the client 200 ceases to send file system operation requests to the source file system 204 and instead redirects or reissues all file system operation requests to the target file system 202. From the perspective of the client 200, the data appears transferred to the target file system 202 from the source file system 204. The client 200 may perform read/write operations on new entries 206, which are directory entries for files and subdirectories or directories that are initially created on the target file system 202 and as such were never present on the source file system 204. To illustrate this example, FIG. 2 shows the target file system 202 as larger than the source file system 204 with the additional new entries 206 present only on the target file system 202.

Further, the client 200 may perform read/write operations on unmigrated directory entries 208 and migrated entries 210. With respect to the unmigrated entries 208, the target file system 202 migrates a corresponding source directory entry 212 from the source file system 204 to the target file system 202 prior to completing the file system operation request from the client 200. In one implementation, the target file system 202 migrates the source directory entry 212 using an optimal number of threads determined as described above with respect to FIG. 1. Regarding the migrated entries 210, once the directory entries have been migrated, the client 200 interacts with the migrated directory entries 210 in a manner similar to the interaction of the client 200 with the new entries 206.

Figure 3:
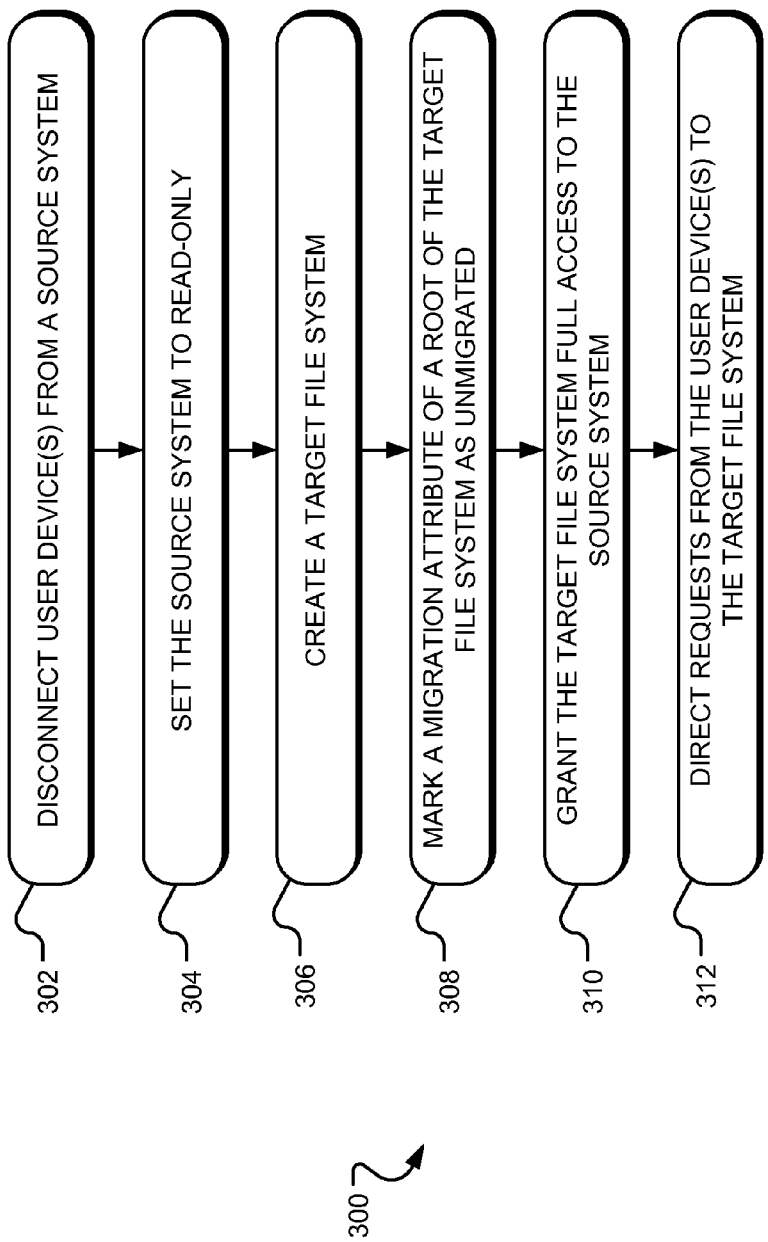
FIG. 3 illustrates example operations for initializing a target for migrating data from a source.

For a detailed description of example operations for migrating data from a source to a target using an optimal number of threads, reference is made to FIGS. 3-7. Turning first to FIG. 3, example operations 300 for initializing a target for migrating data from a source are shown. In one implementation, an operation 302 disconnects one or more user devices from a source file system. The operation 302 may include disconnecting user devices currently accessing the source file system and/or denying new file system operation requests to the source file system.

Once the operation 302 disconnects the user device(s), in one implementation, an operation 304 sets the source file system to read-only, and an operation 306 creates a target file system on the target. Once the target file system is created, the target may be accessed. An operation 308 marks a migration attribute of a root of the target file system to "unmigrated." In one implementation, the migration attribute is an extended attribute.

An operation 310 grants the target on which the target file system is located access to the source file system. In one implementation, the operation 310 grants the target full access to the source file system. In another implementation, the operation 310 grants partial access to the source file system. An operation 312 redirects file system operation requests issued to the source file system to the target file system. Additionally, the operation 312 directs new file system requests to the target file system.

Figure 4:
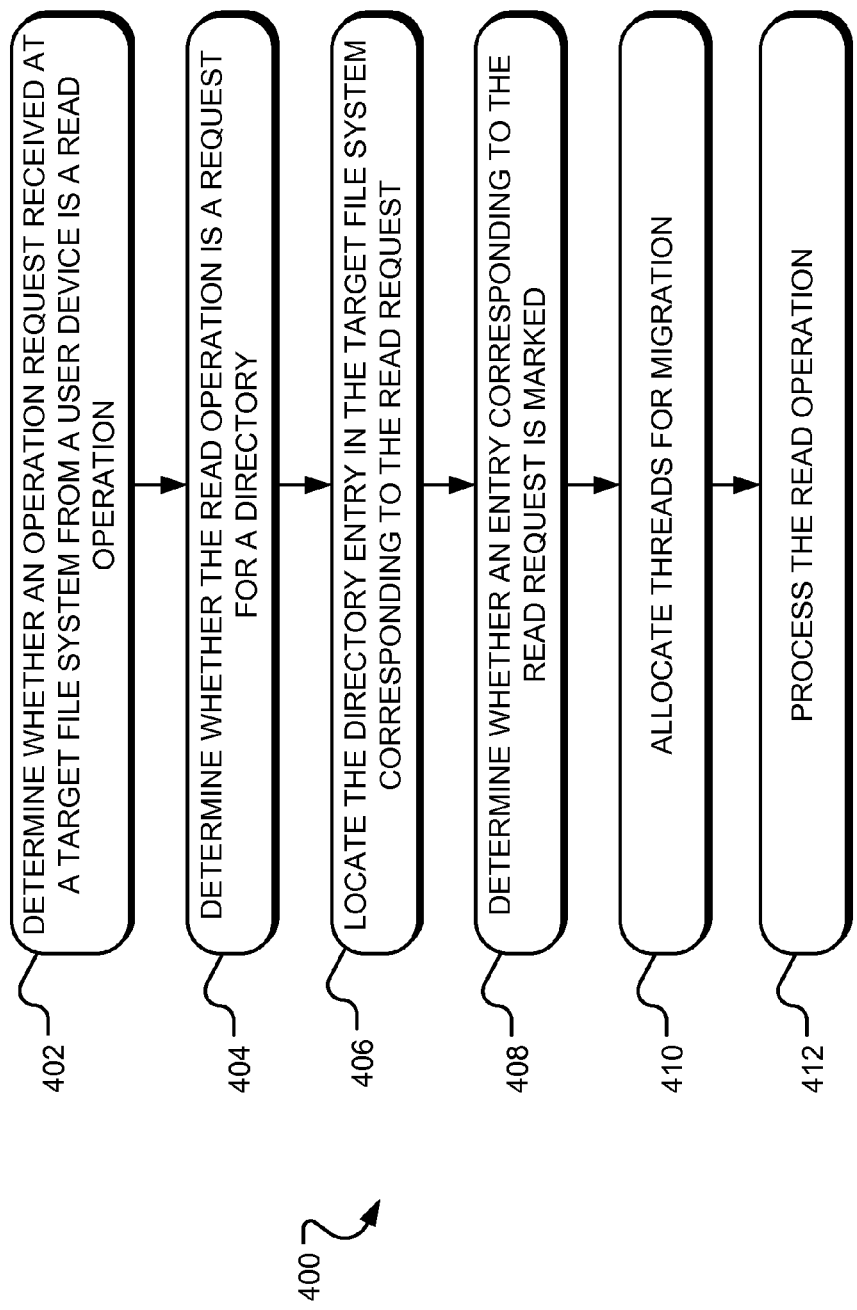
FIG. 4 shows example operations for migrating data in the background from a source to a target.

Referring to FIG. 4, example operations 400 for migrating data in the background from a source to a target, while permitting file system operation requests by one or more users, are illustrated. In one implementation, following the operations 300 to initialize the target, an operation 402 determines whether a file system operation request received at the target file system from a user device is a read request. Where the operation 402 determines that the operation request is not a read request (e.g., a write request), the file system operation request is processed from the target file system. In one implementation, if the file system operation request includes a partial write of file data (i.e., one portion of the file data is to be overwritten), then the corresponding directory entry, including file metadata and file data, is migrated prior to processing the file system operation request from the target file system.

Where the migration of the source file system to the target file system is completed, no shadow processing is required, and the file system operation request is processed from the target file system. The migration of the source file system is complete when all data and metadata from the source file system has been copied or otherwise transmitted to the target file system.

In one implementation, where the migration is not complete and the operation 402 determines that the file system operation request is a read request, an operation 404 determines whether the read operation is a request for a directory. If the operation 404 determines the read request is not for a directory (e.g., for a file), an operation 406 locates a directory entry for the requested file in the target file system. If the operation 404 determines that the read operation is a request for a directory, the operation 406 locates a directory entry corresponding to the requested directory in the target file system. In one implementation, the directory entry includes metadata associated with the directory/file and a migration attribute indicating whether the file/directory has been migrated to the target file system.

An operation 408 determines whether the migration attribute in the directory entry corresponding to the read request is marked (i.e., whether the file/directory has been migrated). In one implementation, where the operation 408 determines that the migration attribute is unmarked, the file/directory corresponding to the read request is migrated to the target file system, and an operation 412 processes the read request from the target file system. A directory is considered migrated where there is a corresponding directory entry for each file and subdirectory with associated metadata in the directory on the target file system for each file and subdirectory in the directory on the source file system. The directory entries for the files in the directory on the target file system do not need to include corresponding file data for the directory to be deemed migrated. A file is considered migrated when the file data for the file has been obtained by the target file system from the source file system.

Where the operation 408 determines that the migration attribute is marked, the file/directory corresponding to the read request has not yet been migrated to the target file system. An operation 410 allocates an optimal number of threads for migration of the file/directory. In one implementation, the optimal number of threads is determined based on the derivative of an expected performance gain, which may be determined based on a time that should be serialized for correctness and a remaining time that can be parallelized with multiple threads. The directory/file is migrated to the target file system using the optimal number of threads, and the migration attribute for the file is unmarked. The operation 412 then processes the read request from the target file system.

Figure 5:
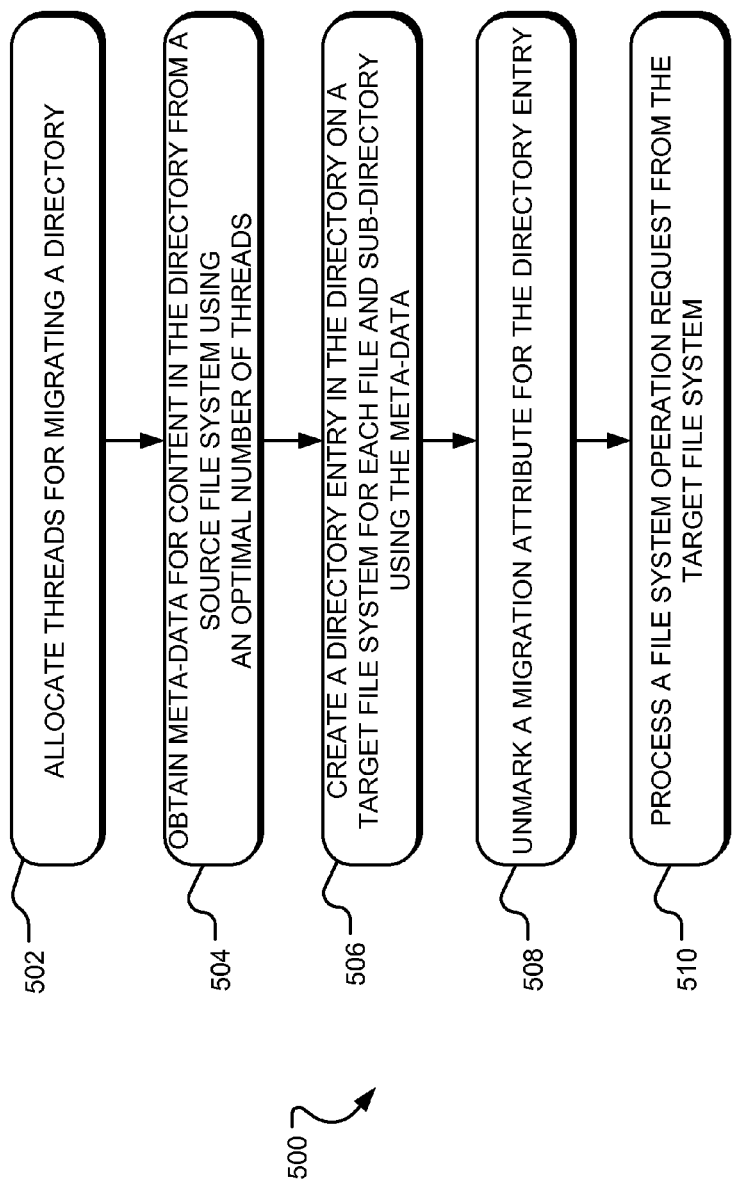
FIG. 5 illustrates example operations for migrating a directory using an optimal number of threads.

For a detailed description of example operations 500 for migrating a directory using an optimal number of threads, reference is made to FIG. 5. In one implementation, an operation 502 allocates one or more threads from a pool of threads for migrating the directory from a source file system to a target file system. As discussed herein, employing multiple threads to migrate a directory, particularly a large directory with many entries can make migration of the directory faster. However, not all migration operations can or should be parallelized or otherwise processed with multiple threads. For example, some migration operations should be serialized for data integrity. With some operations being serialized, there is a number of threads that when exceeded saturates performance gains.

In one implementation, the operation 502 allocates multiple threads, rather than a single thread, for a directory migration where the directory has a number of entries that exceeds a predefined number. For example, the predefined number may be 32. Where the directory exceeds the threshold defined based on the number of entries in the directory, the operation 502 determines an optimal number of threads for the directory migration based on the degree of parallelism available.

Assuming that each directory migration involves [s, p], where s represents the time that should be serialized for correctness and p represents the remaining time that can be parallelized with multiple threads, a single thread takes [s, p] time for a migration, whereas n threads takes $$\left[s, \frac{p}{n}\right]$$

time. The expected performance gain is:

$$G(n) = \frac{[1+d]}{\left[1+\frac{d}{n}\right]},$$

where $$d = \frac{p}{s}$$

and the derivative of the expected performance gain is:

$$G'(n) = d * \frac{(d+1)}{(n+d)^2}$$

From the derivative of the expected performance gain, the minimal number of threads ($n_{min}$) is:

$$(n_{min}) = \max\left\{n_i \mid d * \frac{(d+1)}{(n_i+d)^2} > \Delta\right\},$$

where $\Delta$ represents a demanded minimum performance gain slope.

In one implementation, $\Delta$ is configurable. In another implementation, $\Delta$ is predefined. Where the performance gain is not greater than $\Delta$, the performance is saturated, such that additional threads do not increase performance. Stated differently, the maximum number of threads is represented by the point after which the performance gain is below $\Delta$. The optimal number of threads corresponds to the point at which the performance gain is maximized. In one implementation, the optimal number of threads ($n_{opt}$) is:

$$(n_{opt}) = \min\left[\text{ceil}\left(\frac{val}{\text{thresh}}\right), n_{min}\right],$$

where the ceil function returns the smallest integer value, val is a given value for the directory, and thresh is a predefined threshold (e.g., 32). In one implementation, with a high-speed network between the source and the target, the optimal number of threads for directory migration is approximately 5-6 threads, which obtains a performance gain of approximately 5-6.

In one implementation, an operation 504 obtains metadata for content in the directory (e.g., file metadata and/or subdirectory metadata) from the source file system using the optimal number of threads. An operation 506 creates a directory entry in the directory on the target file system for each file and subdirectory using the metadata. In one implementation, while the directory is being migrated to the target file system, shadows are generated for all directory entries (e.g. files, records, other directories, etc.) within the directory. The shadow of an entry may involve a data path on the source 102 for the entry. In one implementation, a marked directory entry corresponds to a directory entry for a file with a marked migration attribute or directory entry for a subdirectory with a marked migration attribute. Further, the path to each subdirectory and/or file identified with the metadata is stored in an extended attribute for the corresponding directory entry.

An operation 508 unmarks the migration attribute for the directory entry when migration of the directory is complete, and an operation 510 processes the read request using the target file system. The operations 504 and 506 may be processed with multiple threads. In some implementations, for operations that should be serialized, the thread may be assigned with some threads idle while serial operations are occurring.

Figure 6:
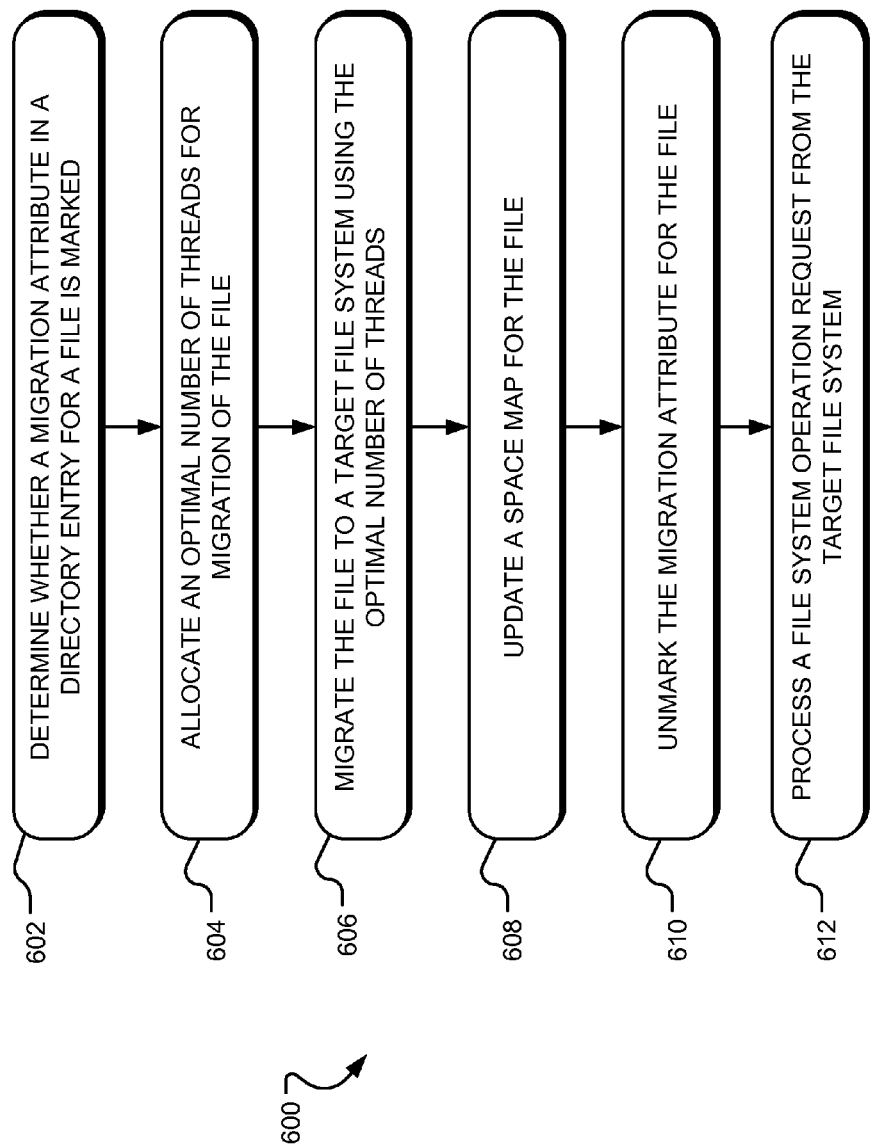
FIG. 6 shows example operations for migrating a file using an optimal number of threads.

Turning to FIG. 6, a detailed description of example operations 600 for migrating a file using an optimal number of threads is provided. In one implementation, an operation 602 locates a directory entry for the file on a target file system. The directory entry for the file includes metadata associated with the file and a migration attribute, which may be marked or unmarked depending on whether the file has been migrated from the source file system to the target file system. A file is considered migrated when the file data has been obtained from the source file system by the target file system. The operation 602 determines whether the migration attribute is marked. If the migration attribute is unmarked, the file has been migrated from the source file system to the target file system, and if the migration attribute is marked, the file has not been migrated and is a shadow file. In one implementation, the operation 602 creates a space map for the file unless already existent followed by the operations 702-710 described with respect to FIG. 7.

In one implementation, where operation 602 determines that the migration attribute is marked, an operation 604 allocates an optimal number of threads to the file migration. The operation 604 allocates multiple threads, rather than a single thread, for a file migration where the file has a size that exceeds a predefined threshold. For example, the predefined threshold may be 256 MB. Where the file exceeds the threshold defined based on the file size, the operation 604 determines an optimal number of threads for the file migration based on the degree of parallelism available.

Assuming that each file migration involves [s, p], where s represents the time that should be serialized for correctness and p represents the remaining time that can be parallelized with multiple threads, a single thread takes [s, p] time for a migration, whereas n threads takes $$\left[s, \frac{p}{n}\right]$$

time. The expected performance gain is:

$$G(n) = \frac{[1+d]}{\left[1+\frac{d}{n}\right]},$$

where $$d = \frac{p}{s}$$

and the derivative of the expected performance gain is:

$$G'(n) = d * \frac{(d+1)}{(n+d)^2}$$

From the derivative of the expected performance gain, the minimal number of threads ($n_{min}$) is:

$$(n_{min}) = \max\left\{n_i \mid d * \frac{(d+1)}{(n_i+d)^2} > \Delta\right\},$$

where $\Delta$ represents a demanded minimum performance gain slope.

In one implementation, $\Delta$ is configurable. In another implementation, $\Delta$ is predefined. Where the performance gain is not greater than $\Delta$, the performance is saturated, such that additional threads do not increase performance. Stated differently, the maximum number of threads is represented by the point after which the performance gain is below $\Delta$. The optimal number of threads corresponds to the point at which the performance gain is maximized. In one implementation, the optimal number of threads ($n_{opt}$) is:

$$(n_{opt}) = \min\left[\operatorname{ceil}\left(\frac{val}{thresh}\right), n_{min}\right],$$

where the ceil function returns the smallest integer value, val is a given value for the file, and thresh is a predefined threshold (e.g., 256). In one implementation, with a high-speed network between the source and the target, the optimal number of threads for file migration is approximately 2 threads, which obtains a performance gain of approximately 2. In one implementation, an operation 606 migrates the file to the target file system using the optimal number of threads. The migration of different files may be parallelized.

In one implementation, a space map is created for the file once migration of the file is initiated. The in-memory and on-disk space maps for each file are initialized with a remote range of the file. The remote range at the time of initialization corresponds to the portions of the file located on the source file system but not on the target file system. In one implementation, an operation 608 updates space map(s) for the file during migration by: updating remote range and/or adding an additional remote range in the in-memory space map to reflect the transfer of data, if any, and; adding a local range to the on-disk space map to reflect the transfer of data, if any. An operation 610 unmarks the migration attribute for the file where the entire file, as opposed to portions of the file, has been copied to the target file system. An operation 612 processes the read request for the file using the target file system and returns the requested data to the client.

Figure 7:
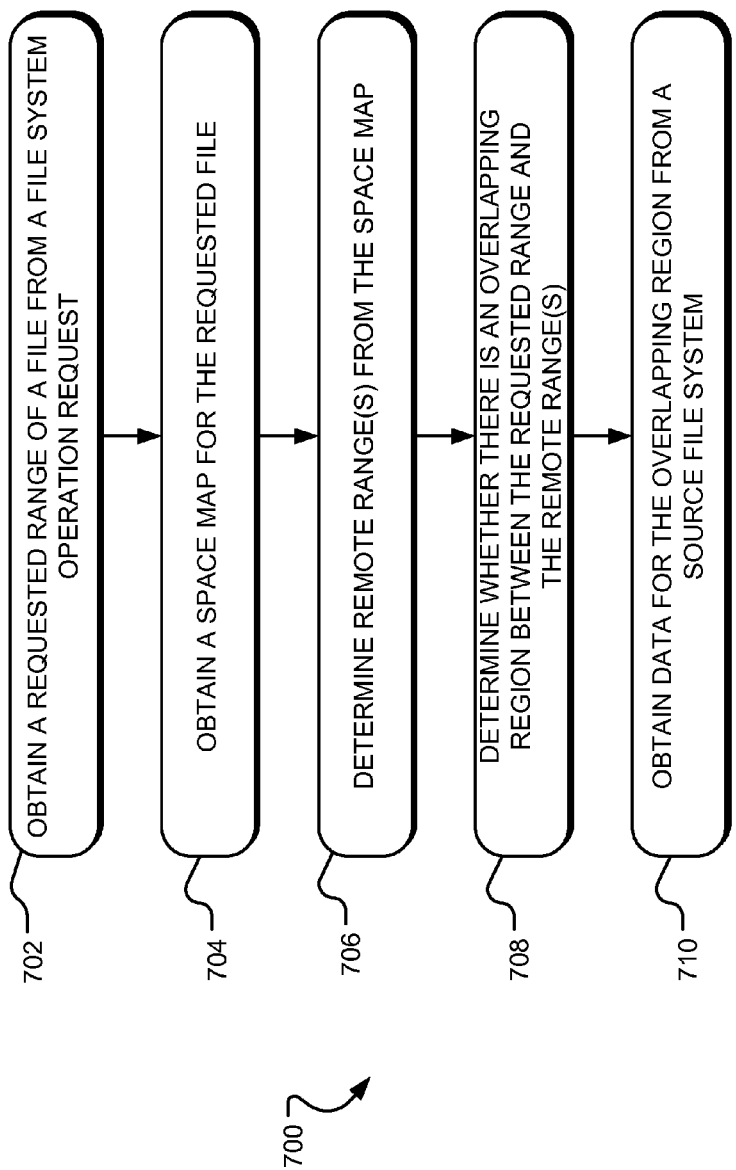
FIG. 7 illustrates example operations for processing a file system operation request during migration.

FIG. 7 illustrates example operations 700 for processing a file system operation request during migration from a source file system to a target file system. In one implementation, an operation 702 obtains a requested range of a file from a file system operation request. The requested range corresponds to the portion of the file specified in the file system operation request. The request range may refer to multiple portions, contiguous or noncontiguous, of the file.

In one implementation, an operation 704 obtains a space map for the file. The space map may be an in-memory space map or an on-disk space map. An operation 706 determines remote range(s) from the space map. In one implementation, the remote range(s) correspond to the portions of the file that exist in the source file system but not in the target file system.

An operation 708 determines whether there is any overlap between the requested range and the remote range. In one implementation, the overlap determines whether any portion if the requested range is not present on the target file system. If there is no overlap, the space map is updated. If there is an overlap between the requested range and the remote range, an operation 710 obtains data corresponding to the overlap from the source file system.

Figure 8:
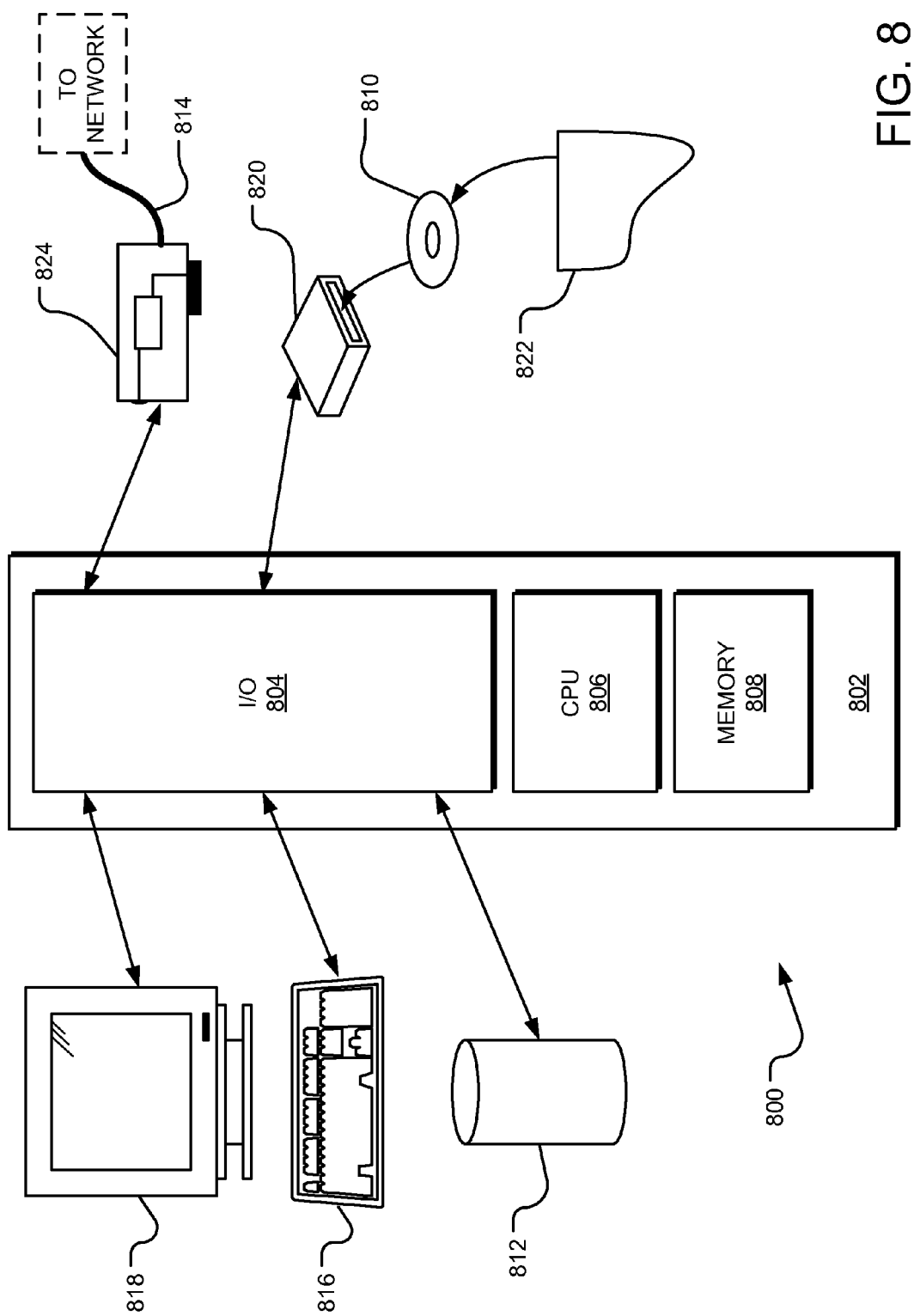
FIG. 8 is an example computing system that may implement various systems and methods discussed herein.

Referring to FIG. 8, a detailed description of an example computing system 800 having one or more computing units that may implement various systems and methods discussed herein is provided. The computing system 800 may be applicable to the source 102, the target 104, the user devices 112-114, or other computing devices. It will be appreciated that specific implementations of these devices may be of differing possible specific computing architectures not all of which are specifically discussed herein but will be understood by those of ordinary skill in the art.

The computer system 800 may be a general computing system is capable of executing a computer program product to execute a computer process. Data and program files may be input to the computer system 800, which reads the files and executes the programs therein. Some of the elements of a general purpose computer system 800 are shown in FIG. 8 wherein a processor 802 is shown having an input/output (I/O) section 804, a Central Processing Unit (CPU) 806, and memory 808. There may be one or more processors 802, such that the processor 802 of the computer system 800 comprises a single central-processing unit 806, or a plurality of processing units, commonly referred to as a parallel processing environment. The computer system 800 may be a conventional computer, a distributed computer, or any other type of computer, such as one or more external computers made available via a cloud computing or other network architecture. The presently described technology is optionally implemented in software devices loaded in memory 808, stored on a configured DVD/CD-ROM 810 or storage unit 812, and/or communicated via a wired or wireless network link 814, thereby transforming the computer system 800 in FIG. 8 to a special purpose machine for implementing the described operations.

The I/O section 804 is connected to one or more user-interface devices (e.g., a keyboard 816 and a display unit 818), the storage unit 812, and/or a disc drive unit 820. In the case of a tablet or smart phone device, there may not be a physical keyboard but rather a touch screen with a computer generated touch screen keyboard. Generally, the disc drive unit 820 is a DVD/CD-ROM drive unit capable of reading the DVD/CD-ROM 810, which typically contains programs and data 822. Computer program products containing mechanisms to effectuate the systems and methods in accordance with the presently described technology may reside in the memory section 804, on the disc storage unit 812, on the DVD/CD-ROM 810 of the computer system 800, or on external storage devices with such computer program products, including one or more database management products, web server products, application server products, and/or other additional software components. Alternatively, the disc drive unit 820 may be replaced or supplemented by an optical drive unit, a flash drive unit, magnetic drive unit, or other storage medium drive unit. Similarly, the disc drive unit 8520 may be replaced or supplemented with random access memory (RAM), magnetic memory, optical memory, and/or various other possible forms of semiconductor based memories commonly found in smart phones and tablets.

The network adapter 824 is capable of connecting the computer system 800 to a network via the network link 814, through which the computer system can receive instructions and data and/or issue file system operation requests. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets or slates, multimedia consoles, gaming consoles, set top boxes, etc.

When used in a LAN-networking environment, the computer system 800 is connected (by wired connection or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are examples of communications devices for and other means of establishing a communications link between the computers may be used.

In an example implementation, shadow migration software and other modules and services may be embodied by instructions stored on such storage systems and executed by the processor 802. Some or all of the operations described herein may be performed by the processor 802. Further, local computing systems, remote data sources and/or services, and other associated logic represent firmware, hardware, and/or software configured to control data access. Such services may be implemented using a general purpose computer and specialized software (such as a server executing service software), a special purpose computing system and specialized software (such as a mobile device or network appliance executing service software), or other computing configurations. In addition, one or more functionalities of the systems and methods disclosed herein may be generated by the processor 802 and a user may interact with a Graphical User Interface (GUI) using one or more user-interface devices (e.g., the keyboard 816, the display unit 818, and the user devices 112-114) with some of the data in use directly coming from online sources and data stores. The system set forth in FIG. 8 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented. Some or all of the steps may be executed in parallel, or may be omitted or repeated.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   identifying a directory to be migrated from a source file system to a target file system;
   comparing a size of the directory in a source file system to a size threshold;
   generating a comparison value by dividing the size of the directory by the size threshold;
   determining, based on comparing the size of the directory in the source file system to the size threshold, that multiple threads are to be used to migrate the directory from the source file system to the target file system;
   determining that a first portion of the directory is to be migrated using a serialized technique;
   determining that a second portion of the directory is to be migrated using a parallelized technique;
   calculating a degree of parallelism available, the degree of parallelism available being based on the first portion of the directory and the second portion of the directory;
   calculating a first number of threads for migrating the directory, the first number of threads determined based on the degree of parallelism available for the migration and a performance gain slope;

calculating a second number of threads to migrate the directory from the source file system to the target file system, the second number of threads determined by comparing the first number of threads to the comparison value;

allocating the second number of threads; and migrating the directory from the source file system to the target file system using the second number of threads.

2. The method of claim 1, wherein the directory corresponds to a directory on the source file system and migrating the directory includes obtaining metadata for content in the directory from the source file system using the second number of threads and creating a corresponding directory entry for each file in the directory on the target file system using the metadata.

3. The method of claim 1, wherein the directory includes one or more directory entries and wherein each directory entry corresponds to a file on the source file system and migrating the file includes copying data for the file from the source file system to the target file system.

4. The method of claim 1, wherein the second number of threads includes a single thread where the size threshold for the directory in the source file system is not exceeded and the second number of threads includes a plurality of threads where the size threshold for the directory in the source file system is exceeded.

5. The method of claim 4, wherein the directory includes one or more directory entries and wherein the second number of threads is 2 threads where a directory entry of the one or more directory entries corresponds to a file on the source file system and a size of the file exceeds the size threshold.

6. The method of claim 4, wherein the directory includes one or more directory entries and wherein the second number of threads is 5 or 6 threads where a number of directory entries in the directory exceeds the size threshold.

7. The method of claim 1, wherein the size of the directory is based on a number of directory entries in the directory.

8. The method of claim 1, wherein the size threshold is exceeded where a number of directory entries in the directory is at least 32.

9. The method of claim 1, wherein the directory includes one or more directory entries, wherein a directory entry of the one or more directory entries corresponds to a file on the source file system, and wherein the size of the directory is based on the size of the file.

10. The method of claim 9, wherein the size threshold is exceeded where the size of the file is at least 256 MB.

11. The method of claim 1, wherein the first number of threads is equal to:

$$(n_{min}) = \max\left\{n_i \mid d * \frac{(d+1)}{(n_i+d)^2} > \Delta\right\},$$

where d is represented by an equation $$d = \frac{p}{s},$$

s represents a time that should be serialized for correctness, p represents a remaining time that can be parallelized with multiple threads, n represents a number of threads, i represents a specific thread of the n number of threads, and $\Delta$ represents the performance gain slope.

12. The method of claim 11, wherein the second number of threads is equal to ($n_{opt}$) which is expressed as:

$$(n_{opt}) = \min\left[\text{ceil}\left(\frac{val}{\text{thresh}}\right), n_{min}\right],$$

where ceil returns a smallest integer value, val represents the size of the directory, and thresh is the size threshold.

13. One or more non-transitory tangible computer-readable storage media storing computer-executable instructions for performing a computer process on a computing system, the computer process comprising:

identifying a directory to be migrated from a source file system to a target file system;

comparing a size of the directory in a source file system to a size threshold;

generating a comparison value by dividing the size of the directory by the size threshold;

determining, based on comparing the size of the directory in the source file system to the size threshold, that multiple threads are to be used to migrate the directory from the source file system to the target file system;

determining that a first portion of the directory is to be migrated using a serialized technique;

determining that a second portion of the directory is to be migrated using a parallelized technique;

calculating a degree of parallelism available, the degree of parallelism available being based on the first portion of the directory and the second portion of the directory;

calculating a first number of threads for migrating the directory, wherein calculating the first number of threads is based on the degree of parallelism available for the migration and a performance gain slope;

calculating a second number of threads to migrate the directory from the source file system to the target file system, the second number of threads determined by comparing the first number of threads to the comparison value;

allocating the second number of threads; and migrating the directory from the source file system to the target file system using the second number of threads.

14. The one or more non-transitory tangible computer-readable storage media of claim 13, wherein migrating the directory includes obtaining metadata for content in the directory from the source file system using the second number of threads and creating a corresponding directory entry for each file in the directory on the target file system using the metadata.

15. The one or more non-transitory tangible computer-readable storage media of claim 13, wherein the directory includes one or more directory entries, and wherein each directory entry corresponds to a file on the source file system and migrating the file includes copying data for the file from the source file system to the target file system.

16. The one or more non-transitory tangible computer-readable storage media of claim 15, wherein migrating the file further includes updating a space map for the file.

17. The one or more non-transitory tangible computer-readable storage media of claim 13, wherein the second number of threads includes a single thread where the size threshold is not exceeded and the second number of threads includes a plurality of threads where the size threshold is exceeded.

18. The one or more non-transitory tangible computer-readable storage media of claim 17, wherein the size of the directory is based on a number of entries in the directory.

19. The one or more non-transitory tangible computer-readable storage media of claim 17, wherein the directory includes one or more directory entries where a directory entry of the one or more directory entries corresponds to a file on the source file system and a size of the file is compared to the size threshold.

20. The one or more non-transitory tangible computer-readable storage media of claim 13, wherein the degree of parallelism available is determined based on a derivative of an expected performance gain.

21. The one or more non-transitory tangible computer-readable storage media of claim 13, wherein the first number of threads is equal to:

$$(n_{min}) = \max\left\{n_i \mid d * \frac{(d+1)}{(n_i+d)^2} > \Delta\right\},$$

where d is represented by an equation $$d = \frac{p}{s},$$

s represents a time that should be serialized for correctness, p represents a remaining time that can be parallelized with multiple threads, n represents a number of threads, i represents a specific thread of the n number of threads, and $\Delta$ represents the performance gain slope.

22. The one or more non-transitory tangible computer-readable storage media of claim 21, wherein the second number of threads is equal to ($n_{opt}$) which is expressed as:

$$(n_{opt}) = \min\left[\operatorname{ceil}\left(\frac{val}{thresh}\right), n_{min}\right],$$

where ceil returns a smallest integer value, val represents the size of the directory, and thresh is the size threshold.

23. A system comprising:
one or more processors;
a first physical memory device including a source file system managing existing data including a directory that includes one or more directory entries; and
a second physical memory device in communication with the first physical memory device, the second physical memory device including a target file system wherein the second physical memory device stores computer-executable instructions that, when executed by the one or more processors, perform operations including:
identifying the directory to be migrated from a source file system to a target file system;
comparing a size of the directory to a size threshold, generating a comparison value by dividing the size of the directory by the size threshold;
determining, based on comparing the size of the directory to the size threshold, that multiple threads are to be used to migrate the directory from the source file system to the target file system;
determining that a first portion of the directory is to be migrated using a serialized technique;
determining that a second portion of the directory is to be migrated using a parallelized technique;
identifying a degree of parallelism available, the degree of parallelism available being based on the first portion of the directory and the second portion of the directory;
determining a first number of threads based on the degree of parallelism available and a performance gain slope;
determining a second number of threads by comparing the first number of threads to the comparison value;
allocating the second number of threads; and
migrating the directory from the source file system to the target file system using the second number of threads.

24. The system of claim 23, wherein migrating the directory includes obtaining metadata for content in the directory from the source file system using the second number of threads and creating a corresponding directory entry for each file in the directory on the target file system using the metadata.

25. The system of claim 23, wherein a directory entry of the one or more directory entries corresponds to a file on the source file system and migration includes copying data for the file from the source file system to the target file system.

26. The system of claim 23, wherein the second number of threads includes a single thread where the size threshold is not exceeded and the second number of threads includes a plurality of threads where the size threshold is exceeded.

27. The system of claim 23, wherein the first number of threads is equal to:

$$(n_{min}) = \max\left\{n_i \mid d * \frac{(d+1)}{(n_i+d)^2} > \Delta\right\},$$

where d is represented by an equation $$d = \frac{p}{s},$$

s represents a time that should be serialized for correctness, p represents a remaining time that can be parallelized with multiple threads, n represents a number of threads, i represents a specific thread of the n number of threads, and $\Delta$ represents the performance gain slope.

28. The system of claim 27, wherein the second number of threads is equal to ($n_{opt}$) which is expressed as:

$$(n_{opt}) = \min\left[\operatorname{ceil}\left(\frac{val}{thresh}\right), n_{min}\right],$$

where ceil returns a smallest integer value, val represents the size of the directory, and thresh is the size threshold.

* * * * *